(12) United States Patent
Devarayanigari et al.

(10) Patent No.: US 11,184,876 B2
(45) Date of Patent: Nov. 23, 2021

(54) METHOD AND USER EQUIPMENT FOR HANDLING SERVICE CONNECTIVITY IN WIRELESS COMMUNICATION SYSTEM

(71) Applicant: Samsung Electronics Co., Ltd., Suwon-si (KR)

(72) Inventors: Pavan Kumar Devarayanigari, Bangalore (IN); Ramkumar Thirumalli Sureshsah, Bangalore (IN); Venkata Anil Kumar Karamsetti, Bangalore (IN); Bharat Vinayak Bhat, Bangalore (IN); Lalith Kumar, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/595,638

(22) Filed: Oct. 8, 2019

(65) Prior Publication Data

US 2020/0137716 A1    Apr. 30, 2020

(30) Foreign Application Priority Data

Oct. 8, 2018   (IN) ............................. 201841038035
Oct. 7, 2019   (IN) ............................. 201841038035

(51) Int. Cl.
*H04W 4/00*     (2018.01)
*H04W 68/02*    (2009.01)
(Continued)

(52) U.S. Cl.
CPC ......... *H04W 68/02* (2013.01); *H04L 61/2076* (2013.01); *H04W 4/14* (2013.01);
(Continued)

(58) Field of Classification Search
None
See application file for complete search history.

(56) References Cited

U.S. PATENT DOCUMENTS

2011/0103277 A1*  5/2011  Watfa ............... H04W 36/0033
                                                           370/310
2016/0295395 A1   10/2016 Hashmi et al.
(Continued)

FOREIGN PATENT DOCUMENTS

WO    WO-2017-151259 A1    9/2017

OTHER PUBLICATIONS

Dash_WO-2017-151259A1-pub.date-9-8-2017.pdf (Year: 2017).*
"Change Requests", 3GPP, A Global Initiative, 2019, https://www.3gpp.org/specifications/84-change-requests.

*Primary Examiner* — Jinsong Hu
*Assistant Examiner* — Alexander J Yi
(74) *Attorney, Agent, or Firm* — Harness, Dickey & Pierce, P.L.C.

(57) ABSTRACT

A method for handling a service connection in a wireless communication system, including detecting, by a User Equipment (UE), a Mobility Management (MM) service state of the UE is set to ATTEMPTING TO UPDATE, receiving, by the UE, a valid Temporary Mobile Subscriber Identity (TMSI) in a TMSI reallocation procedure from a base station via a Radio Resource Control (RRC) connection, changing, by the UE, the MM service state to a NORMAL SERVICE state in response to the receiving a valid TMSI and the detecting a MM service state, and sending, by the UE, a paging response message to the base station in response to the changing the MM service state and a paging indication message received from the base station to establish the service connection, the paging indication message including the valid TMSI.

16 Claims, 8 Drawing Sheets

(51) Int. Cl.
*H04W 8/02* (2009.01)
*H04L 29/12* (2006.01)
*H04W 60/04* (2009.01)
*H04W 76/38* (2018.01)
*H04W 72/04* (2009.01)
*H04W 4/14* (2009.01)

(52) U.S. Cl.
CPC ............ *H04W 8/02* (2013.01); *H04W 60/04* (2013.01); *H04W 72/048* (2013.01); *H04W 76/38* (2018.02); *H04L 61/6054* (2013.01)

(56) References Cited

U.S. PATENT DOCUMENTS

2016/0295451 A1* 10/2016 Kumar ................ H04L 61/6054
2017/0135010 A1* 5/2017 Iwai ...................... H04W 60/06

* cited by examiner

METHOD AND USER EQUIPMENT FOR HANDLING SERVICE CONNECTIVITY IN WIRELESS COMMUNICATION SYSTEM

CROSS-REFERENCE TO RELATED APPLICATIONS

This application claims priority under 35 U.S.C. § 119 to Indian Provisional Patent Application No. 201841038035 filed on Oct. 8, 2018 in the Indian Intellectual Property Office, and Indian Patent Application No. 201841038035 filed on Oct. 7, 2019 in the Indian Intellectual Property Office, the disclosure of each which is incorporated by reference herein in its entirety.

BACKGROUND

The present disclosure relates to a wireless communication system, and more specifically related to a method and User Equipment (UE) for handling service connectivity in the wireless communication system.

According to 3rd Generation Partnership Project (3GPP) specification 24.008, when the Mobility Management (MM) Service state of a User Equipment (UE) in a Global System for Mobile communication (GSM) or Universal Mobile Telecommunications Service (UMTS) Radio Access Technology (RAT) has entered into an ATTEMPTING TO UPDATE state during which the T3211 timer runs, the UE does not respond to a received paging message including a Temporary Mobile Subscriber Identity (TMSI). Instead, in the ATTEMPTING TO UPDATE MM Service state, the UE responds to the received paging message when the paging message includes an International Mobile Subscriber Identity (IMSI).

In such case (e.g., when responding to the received paging message with the IMSI), when a paging response message is triggered, the T3211 timer (which is running) stops. A Radio Resource Control (RRC) connection is established with a base station for performing TMSI RE-ALLOCATION. For example, the UE receives a new TMSI from the base station and stores the new TMSI. Connection management (CM) layer procedures corresponding to the received paging message are completed and connection (e.g., a Radio Resource Control (RRC) connection with a base station) release is performed. While the MM Service state of the UE remains in an ATTEMPTING TO UPDATE state, the UE waits for T3212 expiry or the UE waits for change of location area (LA) to trigger the location update procedure to the base station.

SUMMARY

Some example embodiments provide a method for handling a service connectivity in a wireless communication system.

Some example embodiments provide for detecting that a UE is in a MM service state attempting to update.

Some example embodiments provide for receiving a valid TMSI in a TMSI reallocation procedure when the UE exists a Radio Resource Control (RRC) connection.

Some example embodiments provide for changing the MM service state to a NORMAL SERVICE state based on the TMSI reallocation procedure.

Some example embodiments provide for changing an update status to U1 UPDATED.

Some example embodiments provide for performing a location updating procedure on a RRC connection release to indicate that a TMSI reallocation procedure is not performed to a base station in response to receiving the paging message with the IMSI, when the timer is running.

Some example embodiments provide a method for handling a service connection in a wireless communication system. The method includes detecting, by a User Equipment (UE), a Mobility Management (MM) service state of the UE is set to ATTEMPTING TO UPDATE, receiving, by the UE, a valid Temporary Mobile Subscriber Identity (TMSI) in a TMSI reallocation procedure from a base station via a Radio Resource Control (RRC) connection, changing, by the UE, the MM service state to a NORMAL SERVICE state in response to the receiving a valid TMSI and the detecting a MM service state, and sending, by the UE, a paging response message to the base station in response to the changing the MM service state and a paging indication message received from the base station to establish the service connection, the paging indication message including the valid TMSI.

In some example embodiments, further, the method includes changing, by the UE, an update status of the UE to U1 UPDATED in response to the receiving a valid TMSI.

In some example embodiments, the service connection is at least one of a call connection, a Short Message Service (SMS) connection or a supplementary service (SS) connection.

Some example embodiments provide a method for handling a service connection in a wireless communication system. The method includes detecting, by a User Equipment (UE), a Mobility Management (MM) service state of the UE is set to ATTEMPTING TO UPDATE, receiving, by the UE, a paging message including an International Mobile Subscriber Identity (IMSI), determining, by the UE, whether a timer is running, performing, by the UE, a location area updating procedure with a base station in response to the detecting a MM service state, the determining the timer is running, and releasing a Radio Resource Control (RRC) connection with the base station associated with the paging message, and establishing the service connection with the base station using a valid Temporary Mobile Subscriber Identity (TMSI) obtained during the location area updating procedure.

Some example embodiments provide a UE for handling a service connection in a wireless communication system. The UE includes processing circuitry configured to detect a Mobility Management (MM) service state of the UE is set to ATTEMPTING TO UPDATE, receive a valid Temporary Mobile Subscriber Identity (TMSI) in a TMSI reallocation procedure from a base station via a Radio Resource Control (RRC) connection, change the MM service state to a NORMAL SERVICE state in response to receiving the valid TMSI and detecting the MM service state is set to ATTEMPTING TO UPDATE, and send a paging response message to the base station in response to changing the MM service state to the NORMAL SERVICE state and a paging indication message received from the base station to establish the service connection, the paging indication message including the valid TMSI.

Some example embodiments provide a UE for handling a service connection in a wireless communication system. The UE includes processing circuitry configured to detect a Mobility Management (MM) service state of the UE is set to ATTEMPTING TO UPDATE, receive a paging message including an International Mobile Subscriber Identity (IMSI), determine whether a timer is running, perform a location area updating procedure with a base station in response to detecting the MM service state is set to ATTEMPTING TO UPDATE, determining the timer is running, and releasing a Radio Resource Control (RRC) connection with the base station associated with the paging message, and establish the service connection with the base station using a valid Temporary Mobile Subscriber Identity (TMSI) obtained during the location area update procedure.

These and other aspects of some example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of some example embodiments herein without departing from the spirit thereof, and some example embodiments herein include all such modifications.

BRIEF DESCRIPTION OF THE DRAWINGS

Some example embodiments are illustrated in the accompanying drawings, throughout which like reference letters indicate corresponding parts in the various figures. Some example embodiments herein will be better understood from the following description with reference to the drawings, in which.

DETAILED DESCRIPTION

Figure 1A:
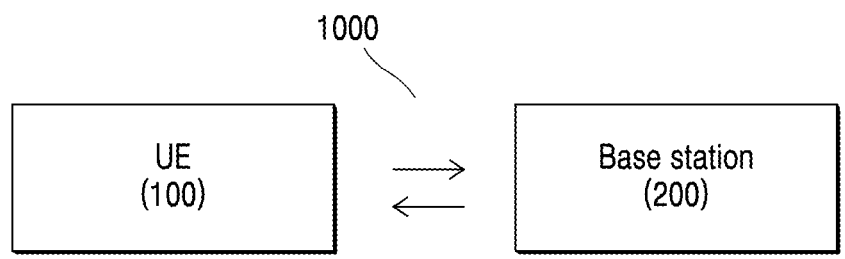
FIG. 1a illustrates an overview of a wireless communication system for handling a service connectivity, according to some example embodiments.

Some example embodiments herein and the various features and advantageous details thereof are explained more fully with reference to the non-limiting examples that are illustrated in the accompanying drawings and detailed in the following description. Descriptions of well-known components and processing techniques may be omitted so as to not unnecessarily obscure the embodiments herein. Also, some example embodiments described herein are not necessarily mutually exclusive, as some example embodiments may be combined with one or more other example embodiments to form new example embodiments. The term "or" as used herein, refers to a non-exclusive or, unless otherwise indicated. The examples used herein are intended merely to facilitate an understanding of ways in which some example embodiments herein may be practiced and to further enable those skilled in the art to practice some example embodiments. Accordingly, the examples should not be construed as limiting the scope of some example embodiments.

As is traditional in the field, some example embodiments may be described and illustrated in terms of blocks which carry out a described function or functions. These blocks, which may be referred to herein as units or modules or the like, may be physically implemented by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Accordingly, the blocks may be physically implemented by analog and/or digital circuits such as logic gates, integrated circuits, microprocessors, microcontrollers, memory circuits, passive electronic components, active electronic components, optical components, hardwired circuits, and/or the like, and/or may optionally be driven by firmware and/or software. The circuits may, for example, be embodied in one or more semiconductor chips, and/or on substrate supports such as printed circuit boards and/or the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of some example embodiments may be physically separated into two or more interacting and discrete blocks without departing from the scope of some example embodiments. Likewise, the blocks of some example embodiments may be physically combined into more complex blocks without departing from the scope of some example embodiments.

The accompanying drawings are used to help easily understand various technical features and it should be understood that some example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

According to some example embodiments, when a UE responds to a received paging message including an IMSI, a paging response message is triggered and a T3211 timer (which is running) stops. A Radio Resource Control (RRC) connection is established with a base station for performing TMSI RE-ALLOCATION. For example, the UE receives a new TMSI from the base station and stores the new TMSI.

In some example embodiments, the UE may receive a TMSI reallocation command from the base station and send a TMSI reallocation complete message to the base station in response. Connection management (CM) layer procedures corresponding to the received paging message are completed and connection (e.g., a Radio Resource Control (RRC) connection with a base station) release is performed. While the MM Service state of the UE remains in an ATTEMPTING TO UPDATE state, the UE waits for T3212 expiry or the UE waits for change of location area (LA) to trigger the location update procedure to the base station.

When a conventional UE subsequently receives a paging message including the new TMSI received during the TMSI RE-ALLOCATION, the conventional UE does not respond to the paging message because the MM Service state of the conventional UE remains in the ATTEMPTING TO UPDATE state. By failing to respond to the paging message, the conventional UE misses an associated service communication. For example, the conventional UE may miss a circuit switched (CS) call, a CS short message service (SMS) message and/or CS supplementary service (SS) information.

Also, the conventional UE remains in the ATTEMPTING TO UPDATE MM Service state until the T3212 timer expires, or the location area (LA) of the conventional UE changes (e.g., due to the T3211 timer being stopped when the TMSI RE-ALLOCATION is performed). Accordingly, the conventional UE remains in the ATTEMPTING TO UPDATE MM Service state for an excessively long period during which the IMSI of the conventional UE is exposed (e.g., with each paging message sent by the base station) to other UEs having the same Discontinuous Reception (DRX) cycle or a similar DRX cycle.

Excerpts from 3GPP TS 24.008: Service State, ATTEMPTING TO UPDATE

When in state MM IDLE and service state ATTEMPTING TO UPDATE the mobile station:

responds to paging (e.g., paging messages including an IMSI); and

Timers of Mobility Management Indicated in Table 1

TABLE 1

| TIMER NUM. | MM STATE | TIME OUT VAL. | CAUSE FOR START | NORMAL STOP | AT THE EXPIRY |
|---|---|---|---|---|---|
| T3211 | MM IDLE, | 15 s | LOCATION UPDATING REJECT with other cause values as described in section 4.4.4.9 lower layer failure or RRC connection released after RRC connection abort during location updating procedure | cell change request for MM establishment change of LA | Restart the location updating procedure. |

Accordingly, some example embodiments herein achieve a method for handling a service connectivity (e.g., service connection) in a wireless communication system. The method includes detecting, by a UE, that the UE is in the ATTEMPTING TO UPDATE MM service state. Further, the method includes receiving, by the UE, a valid TMSI in a TMSI reallocation procedure while the UE is connected to a base station over a RRC connection. Further, the method includes changing, by the UE, the MM service state to a NORMAL SERVICE state based on the TMSI reallocation procedure. Further, the method includes changing, by the UE, an update status to U1 UPDATED.

Some example embodiments provide operations performed in the context of the 3GPP 24.008 standard.

In some example embodiments, upon receipt of a TMSI REALLOCATION COMMAND message, the UE stores the Location Area Identifier (LAI) in a Subscriber Identity Module (SIM)/Universal SIM (USIM). If the received identity is the IMSI of the relevant UE, the UE deletes any TMSI. If the received identity is a TMSI, the UE stores the TMSI in the SIM/USIM. In both cases the UE sends a TMSI REALLOCATION COMPLETE message to the base station.

In some example embodiments, if the UE was in ATTEMPTING TO UPDATE and the UE received a valid TMSI, the UE may set the service state to NORMAL SERVICE and the update status to U1 UPDATED.

The U1 UPDATED update status indicates the last location updating attempt was successful (e.g., the procedure outcome was correct and the answer was acceptance from the base station). With this update status, the SIM/USIM also contains the LAI of the LA where the subscriber is registered, and possibly a valid TMSI, GSM ciphering key, a UMTS integrity key, a UMTS ciphering key and/or a ciphering key sequence number. Furthermore, if the UE supports an A5 ciphering technique using a 128-bit ciphering key and a USIM is in use, then the UE may contain a valid GSM Kc128. The "Location update status" stored on the SIM/USIM may be "updated".

In some example embodiments, if the T3211, T3213 and/or T3246 timer was running, the UE may perform the location updating procedure on RRC connection release provided TMSI reallocation was not performed during a paging procedure.

In some example embodiments, when the UE was in the ATTEMPTING TO UPDATE MM service state, and if the UE receives a valid TMSI in a TMSI reallocation procedure (e.g., when an RRC connection with the base station exists), then the UE may change the MM service state to NORMAL SERVICE and also change the Update status to U1 UPDATED.

In some example embodiments, when the UE was in the ATTEMPTING TO UPDATE MM service state, and if the UE receives the paging message with an IMSI when the timer T3211, T3213, and/or T3246 is running, then the UE may perform a location updating procedure on RRC connection release provided a TMSI reallocation procedure was not performed when RRC connection was available.

Some example embodiments provide an improved UE that may reduce the miss of paging (with TMSI) when the previous paging (with IMSI) was successfully responded and the service was established properly.

Referring now to the drawings, and more particularly to FIGS. 1a through 5, there are shown some example embodiments.

FIG. 1a illustrates an overview of a wireless communication system (1000) for handling service connectivity, according to some example embodiments. In some example embodiments, the service connectivity is at least one of a call connectivity, a Short Message Service (SMS) connectivity and/or a supplementary service (SS) connectivity.

In some example embodiments, the wireless communication system (1000) includes a UE (100) and/or a base station (200). The UE (100) may be but is not limited to, for example, a cellular phone, a tablet, a smart phone, a laptop, a Personal Digital Assistant (PDA), a global positioning system device, a multimedia device, a video device, an internet of things (IoT) device, a smart watch, a game console, an Unmanned Aerial Vehicle (UAV), an airplane, and/or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, and/or the like. The base station (200) may also be referred to as a base transceiver station, a radio base station, a radio transceiver, a transceiver function, a basic service set (BSS), an extended service set (ESS), an eNodeB (eNB), a gNodeB (gNB), and/or the like.

In some example embodiments, the UE (100) may detect (e.g., determine) that the UE (100) is in a ATTEMPTING TO UPDATE MM service state and receive a valid TMSI in a TMSI reallocation procedure when the UE (100) is connected to the base station (200) via a RRC connection. Further, the UE (100) may change the MM service state to NORMAL SERVICE (e.g., from the ATTEMPTING TO UPDATE) based on the TMSI reallocation procedure and change an update status to U1 UPDATED.

Further, the UE (100) may receive a paging indication message from the base station (200) and/or send a paging response message to the base station (200) to establish the service based on the paging indication message. According to some example embodiments, the service may be at least one of a CS call, a Short Message Service (SMS) message and/or supplementary service (SS) information.

In some example embodiments, the UE (100) may detect (e.g., determine) that the UE (100) is in the ATTEMPTING TO UPDATE MM service state and receive the paging message (e.g., the paging indication message) with the IMSI. Further, the UE (100) may determine whether or not a timer is running and/or perform a location updating procedure on the RRC connection release to indicate that the TMSI reallocation procedure is not performed with the base station (200) in response to receiving the paging message with the IMSI when the timer is running. The example detailed operations of handling the call connectivity are explained below in association with FIGS. 4 and 5.

Figure 1B:
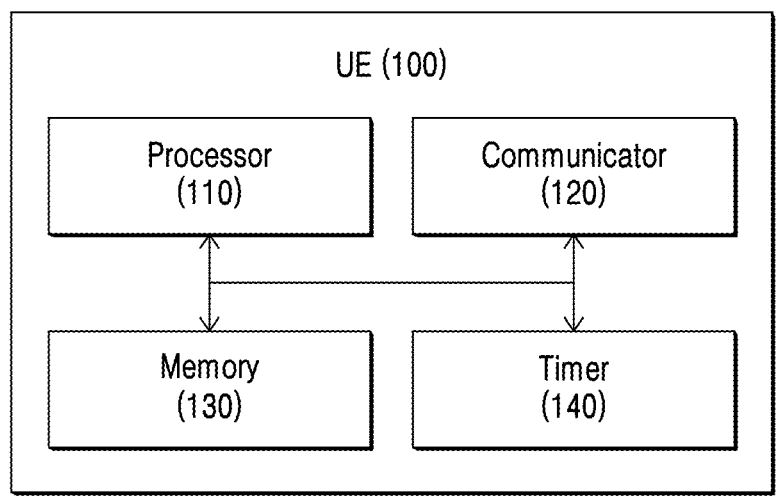
FIG. 1b illustrates various hardware components of the UE, according to some example embodiments.

FIG. 1b illustrates various hardware components of the UE (100), according to some example embodiments. The UE (100) may include a processor (110), a communicator (120), a memory (130) and/or a timer (140). The timer (140) may be a T3211, T3213, T3246 and/or the like. According to some example embodiments, operations described herein as being performed by the UE (100), the processor (110), the communicator (120) and/or the timer (140) may be performed by processing circuitry. The processor (110) may be coupled with the communicator (120), the memory (130) and/or the timer (140). The processor (110) may detect (e.g., determine) that the UE (100) is in the ATTEMPTING TO UPDATE MM service state and receive the valid TMSI in the TMSI reallocation procedure when the UE (100) is connected to the base station (200) via the RRC connection. Further, the processor (110) may change the MM service state to the NORMAL SERVICE state based on the TMSI reallocation procedure and change the update status to U1 UPDATED.

Further, the processor (110) may receive the paging indication message from the base station (200) and/or send the paging response message to the base station (200) to establish the service based on the paging indication message.

In some example embodiments, the processor (110) may detect (e.g., determine) that the UE (100) is in the ATTEMPTING TO UPDATE MM service state and receive the paging message with the IMSI. Further, the processor (110) may determine whether the timer (140) is running and/or perform a location updating procedure on the RRC connection release to indicate that the TMSI reallocation procedure is not performed with the base station (200) in response to receiving the paging message with the IMSI when the timer (140) is running.

Further, the communicator (120) may perform communication internally between internal hardware components and/or with external devices via one or more networks. The memory (130) may store instructions to be executed by the processor (110). The memory (130) may include non-volatile storage elements. Examples of such non-volatile storage elements may include magnetic hard discs, optical discs, floppy discs, flash memories, and/or forms of electrically programmable memories (EPROM) and/or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) may store larger amounts of information than the memory. In certain examples, a non-transitory storage medium may store data that may, over time, change (e.g., in Random Access Memory (RAM) or cache).

Although the FIG. 1b shows various hardware components of the UE (100) but it is to be understood that some example embodiments are not limited thereon. In some example embodiments, the UE (100) may include less or more of the various hardware components. Further, the labels or names of the components are used only for illustrative purpose and does not limit the scope of some example embodiments. One or more components may be combined together to perform the same function or a substantially similar function to handle the call connectivity in the wireless communication system (1000).

Figure 1C:
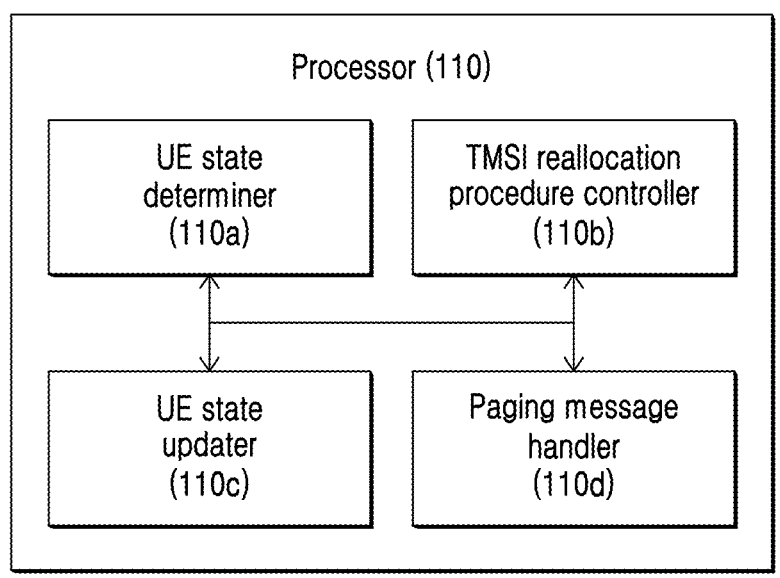
FIG. 1c illustrates various hardware components of a processor, according to some example embodiments.

FIG. 1c illustrates various hardware components of the processor (110), according to some example embodiments. In some example embodiments, the processor (110) includes a UE state determiner (110a), a TMSI reallocation procedure controller (110b), a UE state updater (110c) and/or a paging message handler (110d). According to some example embodiments, operations described herein as being performed by the UE state determiner (110a), the TMSI reallocation procedure controller (110b), the UE state updater (110c) and/or the paging message handler (110d) may be performed by processing circuitry.

The UE state determiner (110a) may detect (e.g., determine) that the UE (100) is in the ATTEMPTING TO UPDATE MM service state. The TMSI reallocation procedure controller (110b) may receive the valid TMSI in the TMSI reallocation procedure when the UE (100) is connected to the base station (200) via the RRC connection. Further, the UE state updater (110c) may change the MM service state to the NORMAL SERVICE state based on the TMSI reallocation procedure and/or change the updated status to U1 UPDATED.

Further, the paging message handler (110d) may receive the paging indication message from the base station (200) and/or send the paging response message to the base station (200) to establish the service based on the paging indication message.

In some example embodiments, the UE state determiner (110a) may detect (e.g., determine) that the UE (100) is in the ATTEMPTING TO UPDATE MM service state. The paging message handler (110d) may receive the paging message with the IMSI. Further, the UE state updater (110c) may determine whether the timer (140) is running and/or perform a location updating procedure on the RRC connection release to indicate that the TMSI reallocation procedure is not performed with the base station (200) in response to receiving the paging message with the IMSI when the timer (140) is running.

Although the FIG. 1b shows various hardware components of the processor (110) but it is to be understood that some example embodiments are not limited thereon. In some example embodiments, the processor (110) may include less or more of the various hardware components. Further, the labels or names of the components are used only for illustrative purpose and does not limit the scope of some example embodiments. One or more components may be combined together to perform the same function or a substantially similar function to handle the call connectivity in the wireless communication system (1000).

Figure 2:
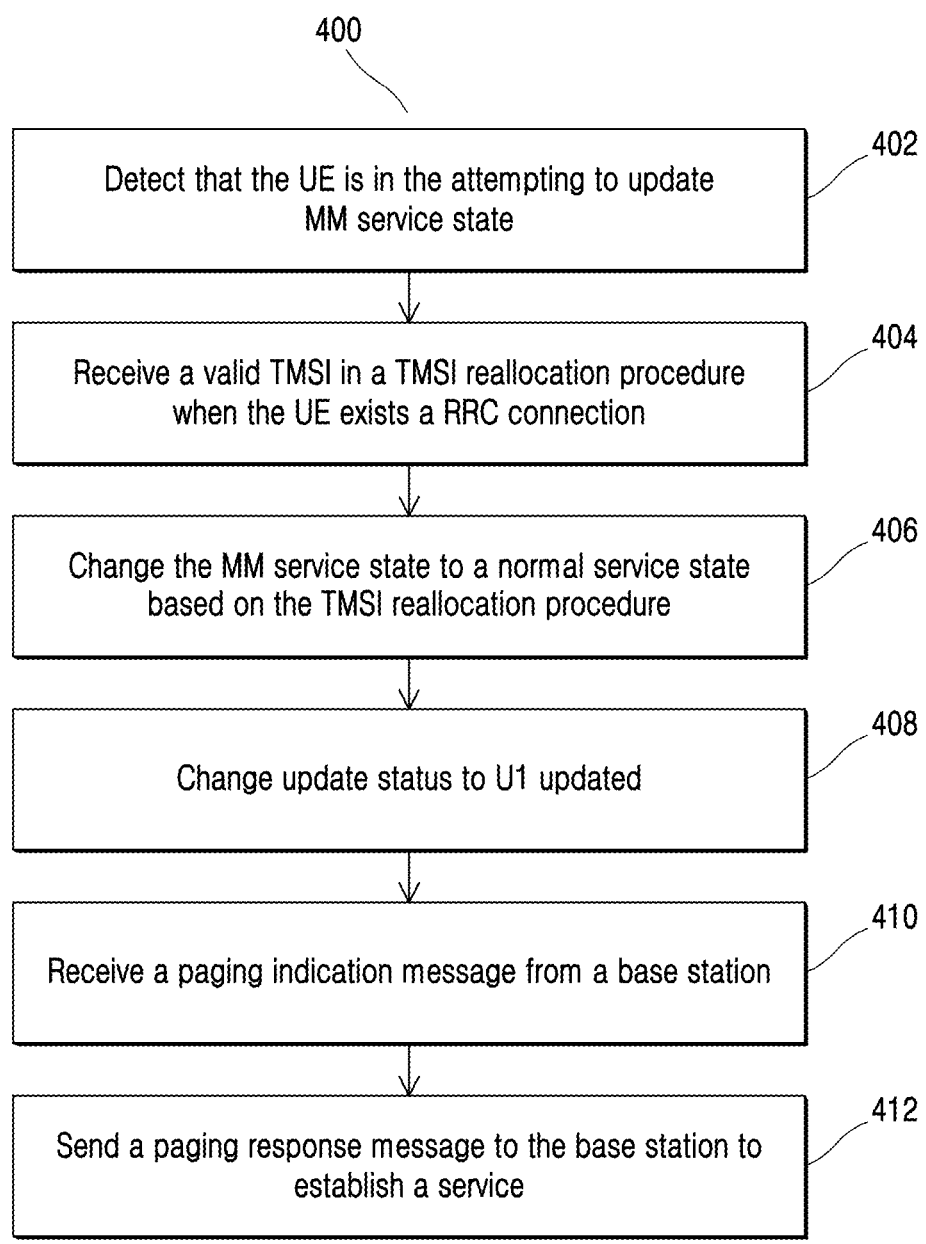
FIG. 2 is a flow diagram illustrating a method for handling the service connectivity in the wireless communication system, when the UE was in the ATTEMPTING TO UPDATE MM service state, and receives the valid TMSI in the TMSI reallocation procedure when the RRC connection exists, according to some example embodiments.

FIG. 2 is a flow diagram (400) illustrating a method for handling service connectivity in the wireless communication system (1000), when the UE (100) was in the ATTEMPTING TO UPDATE MM service state, receives the valid TMSI in the TMSI reallocation procedure when the RRC connection exists, according to some example embodiments. The operations (402-412) may be performed by processing circuitry (e.g., the processor (110)).

At operation 402, the method includes detecting (e.g., determine) that the UE (100) is in the ATTEMPTING TO UPDATE MM service state. For example, the UE (100) may store an MM service state parameter (e.g., in the memory 130) and may update the value of the MM service state parameter upon each change in the MM service state. According to some example embodiments, the UE (100) may determine that the UE (100) is in the ATTEMPTING TO UPDATE MM service state by reading the value of the MM service state parameter. At operation 404, the method includes receiving the valid TMSI in the TMSI reallocation procedure when the UE (100) is connected to the base station (200) via the RRC connection. For example, the TMSI (e.g., the TMSI of the UE (100)) may be received from the base station (200) and may be valid in that the TMSI corresponds to a current location area (LA) of the UE (100). At operation 406, the method includes changing the MM service state to the NORMAL SERVICE state based on the TMSI reallocation procedure. According to some example embodiment, the UE (100) may change the MM service state to the NORMAL SERVICE state in response to receiving the valid TMSI and/or in response to determining the UE (100) is in the ATTEMPTING TO UPDATE MM service state, and may update the MM service state parameter accordingly. At operation 408, the method includes changing the update status to U1 UPDATED (e.g., in response to in response to one or more of receiving the valid TMSI, determining the UE (100) is in the ATTEMPTING TO UPDATE MM service state, and/or changing the MM service state to the NORMAL SERVICE state). For example, the UE (100) may store an update status parameter (e.g., in the memory 130) and may update the value of the update status parameter upon each change in the update status. At operation 410, the method includes receiving the paging indication message from the base station (200). For example, the UE (100) may receive a paging indication message including the valid TMSI. At operation 412, the method includes sending the paging response message to the base station (200) to establish the service. Accordingly, some example embodiments provide an improved UE that responds to the paging messages to which the conventional UEs fail to respond. In particular, by changing the MM service state to the NORMAL SERVICE state, and/or changing the update status to U1 UPDATED, the improved UE responds to the received paging indication message including the TMSI. Therefore, the improved UE receives the incoming service communication associated with the received paging indication (e.g., the circuit switched (CS) call, the CS short message service (SMS) message and/or the CS supplementary service (SS) information) missed by the conventional UEs.

Figure 3:
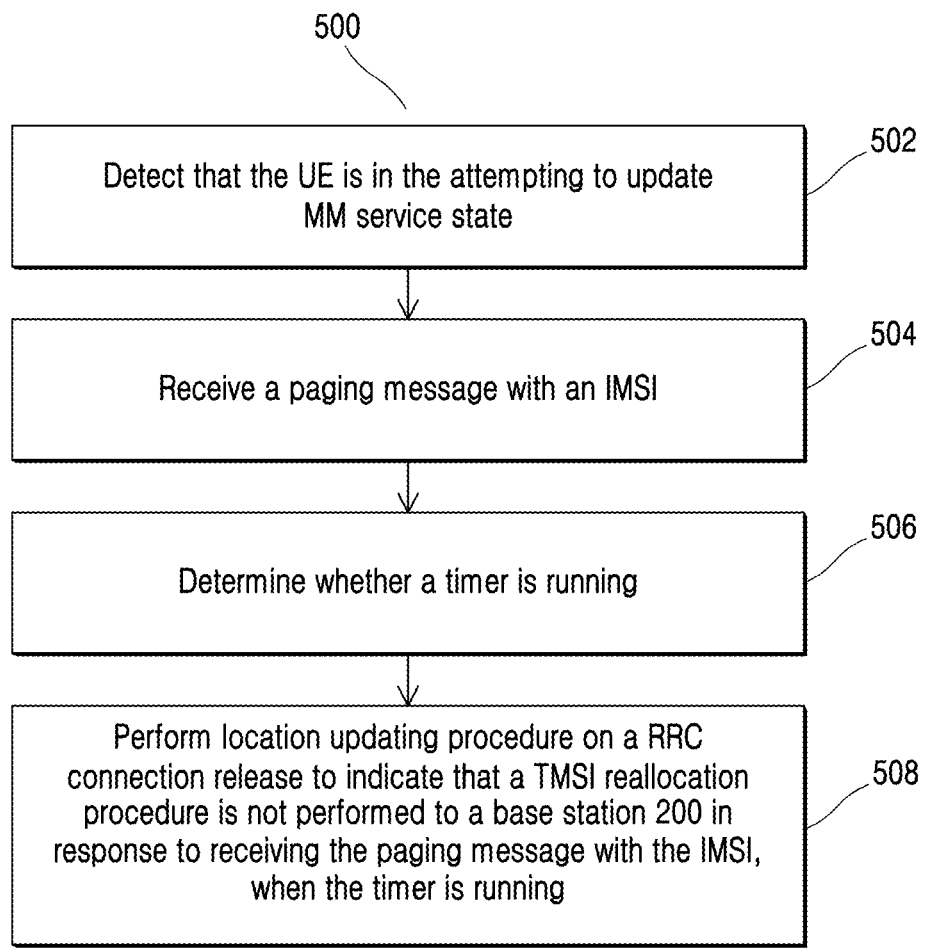
FIG. 3 is a flow diagram illustrating a method for handling the service connectivity in the wireless communication system, when the UE was in the ATTEMPTING TO UPDATE MM service state, and receives the paging message with IMSI when the timer T3211, T3213, and/or T3246 is running, according to some example embodiments.

FIG. 3 is a flow diagram (500) illustrating a method for handling the service connectivity in the wireless communication system (1000), when the UE (100) was in the ATTEMPTING TO UPDATE MM service state, receives the Paging message with IMSI when the timer T3211, T3213, and/or T3246 is running, according to some example embodiments. The operations (502-508) may be performed by processing circuitry (e.g., the processor (110)).

At operation 502, the method includes detecting (e.g., determining) that the UE (100) is in the ATTEMPTING TO UPDATE MM service state. For example, the UE (100) may store an MM service state parameter (e.g., in the memory 130) and may update the value of the MM service state parameter upon each change in the MM service state. According to some example embodiments, the UE (100) may determine that the UE (100) is in the ATTEMPTING TO UPDATE MM service state by reading the value of the MM service state parameter. At operation 504, the method includes receiving a paging message (e.g., a paging indication message) including an IMSI of the UE (100). According to some example embodiments, the UE (100) may stop the T3211 timer in response to receiving the paging message in operation 504. At operation 506, the method includes determining whether the timer (140) (e.g., the T3212 timer) is running. According to some example embodiments, the timer (140) may be a timer parameter stored at the UE (100) (e.g., in the memory 130) indicating whether the timer (140) is running. The UE (100) may determine whether the timer (140) is running by reading the value of the timer parameter. At operation 508, the method includes performing the location area updating (LAU) procedure on the RRC connection release to indicate that the TMSI reallocation procedure is not performed with the base station 200 in response to receiving the paging message with the IMSI when the timer (140) is running. According to some example embodiments, the UE (100) may perform the LAU procedure immediately or promptly after a service communication associated with the paging indication message is completed based on a criterion. According to some example embodiments, the criterion may include the UE (100) determining that the T3212 timer is running after the service communication associated with the paging indication message is completed. According to some example embodiments, the criterion may include the UE (100) determining that the MM servicing state is still set to ATTEMPTING TO UPDATE after the service communication associated with the paging indication message is completed. According to some example embodiments, the LAU procedure would be performed according to one or more methods known to a person having ordinary skill in the art. Accordingly, some example embodiments provide an improved UE avoid or reduce the excessively long periods during which the conventional UEs remain in the ATTEMPTING TO UPDATE MM Service state. For example, the improved UE may perform the LAU procedure immediately or promptly after a service communication associated with the paging indication message is completed based on a criterion. Therefore, the improved UE reduces period during which the IMSI of the UE is exposed, thereby improving the security of the IMSI of the UE.

The various actions, acts, blocks, operations, or the like in the flow diagrams (400 and 500) may be performed in the order presented, in a different order, or simultaneously or contemporaneously. Further, in some example embodiments, some of the actions, acts, blocks, operations, or the like may be omitted, added, modified, skipped, or the like without departing from the scope of some example embodiments.

Figure 4:
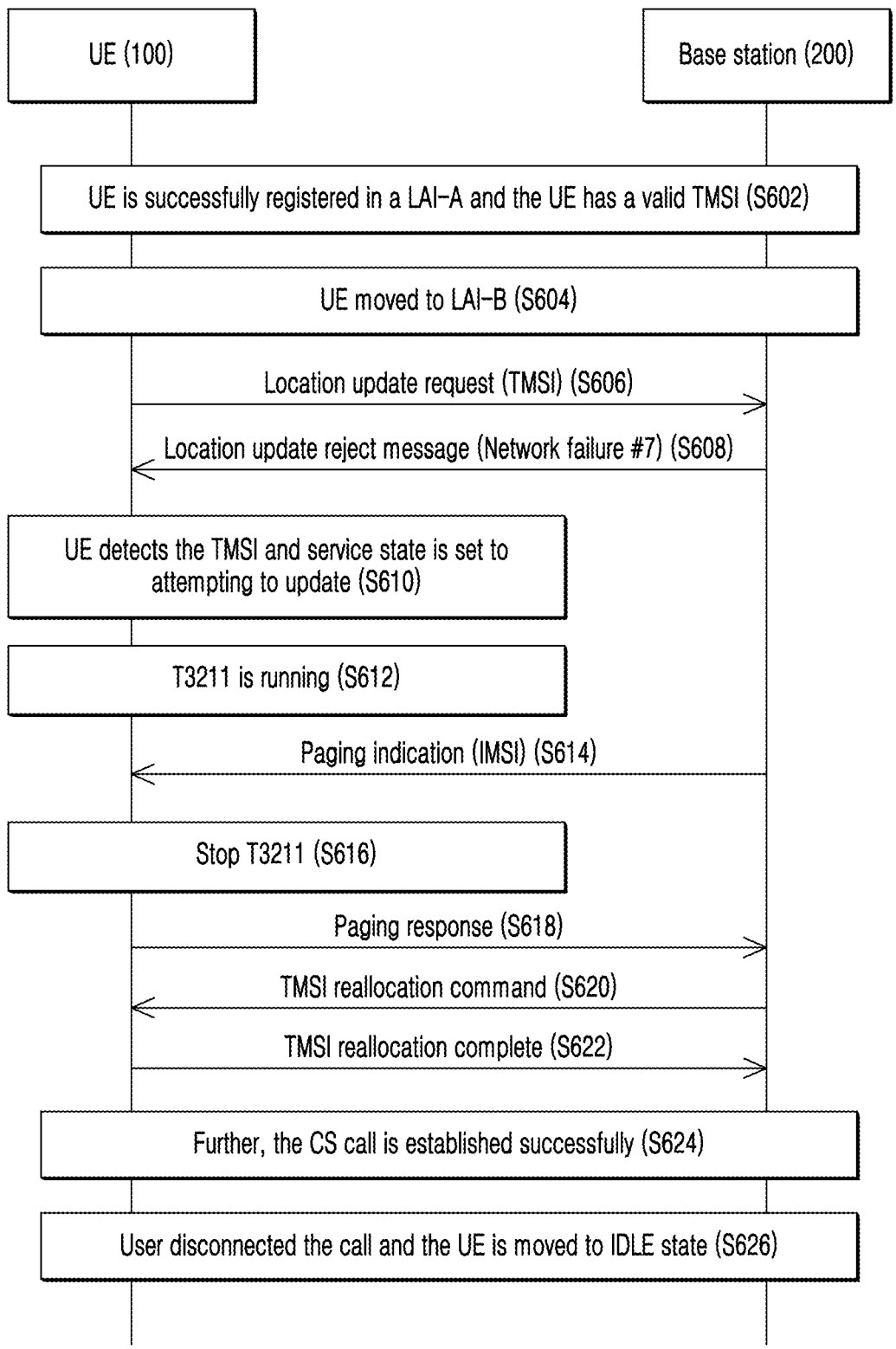
FIG. 4 is an example sequence flow diagram illustrating operations for handling the call connectivity in the wireless communication system (1000), when the UE (100) was in the ATTEMPTING TO UPDATE MM service state, and receives the valid TMSI in the TMSI reallocation procedure when the RRC connection exists, according to some example embodiments.
Figure 4:
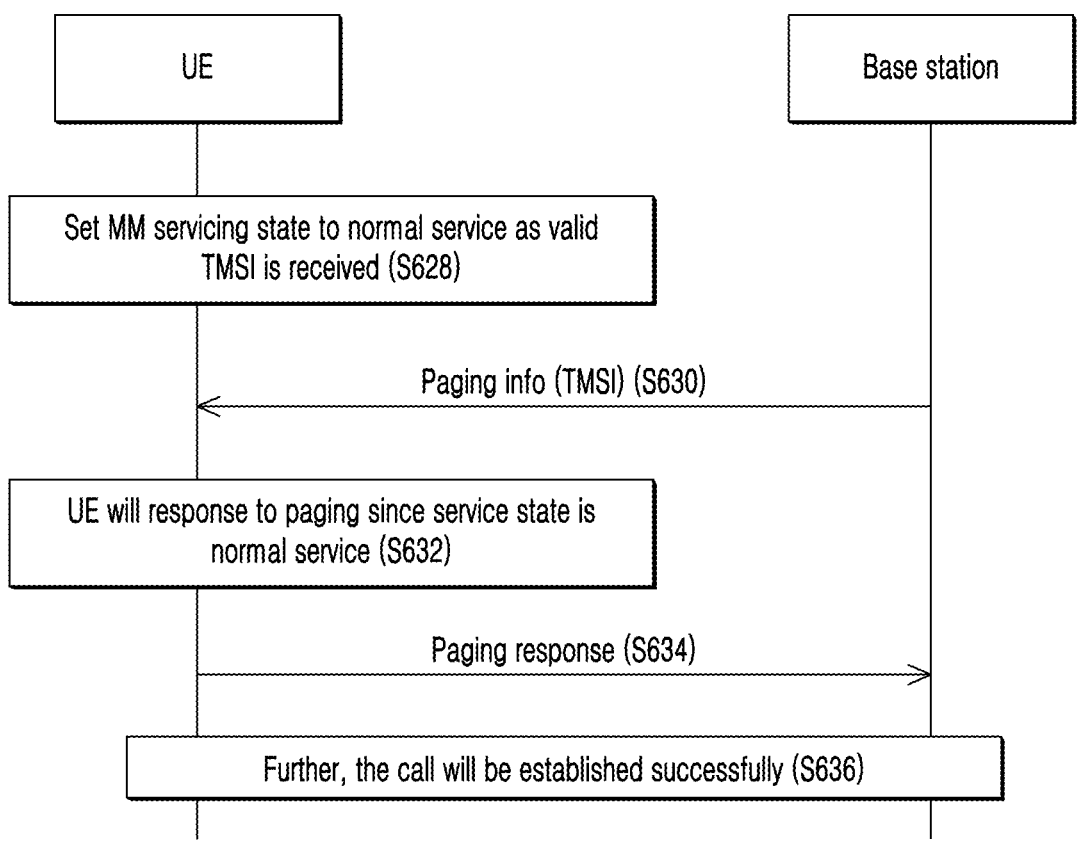

FIG. 4 is an example sequence flow diagram illustrating operations for handling the call connectivity in the wireless communication system (1000), when the UE (100) was in the ATTEMPTING TO UPDATE MM service state, and receives the valid TMSI in the TMSI reallocation procedure when the RRC connection exists, according to some example embodiments.

At operation S602, the UE (100) may be successfully registered in the LAI-A and the UE (100) has the valid TMSI (e.g., a TMSI associated with the UE (100) and the LAI-A). At operation S604, the UE (100) may move to the LAI-B. At operation S606, the UE (100) may send the location update request message with the TMSI to the base station (200). At operation S608, the base station (200) may send the location update reject message to the UE (100) based on the network failure cause value #7. At operation S610, the UE (100) may detect that the TMSI and the MM service state is set to ATTEMPTING TO UPDATE (e.g., as a result of operations S604-S608). For example, the UE (100) may detect (e.g., determine) that the TMSI is invalid and that the MM service state is set to ATTEMPTING TO UPDATE. At operation S612, the UE (100) may detect that the T3211 timer is running. At operation S614, the UE (100) may receive the paging indication with an IMSI (e.g., an IMSI of the UE (100)) from the base station (200).

At operation S616, the UE (100) may stop the T3211 timer. At operation S618, the UE (100) may send the paging response to the base station (200). At operation S620, the UE (100) may receive the TMSI reallocation command from the base station (200). For example, the TMSI reallocation command may include a valid TMSI associated with the UE (100) and the LAI-B. At operation S622, the UE (100) may send the TMSI reallocation complete (e.g., an indication of successful TMSI reallocation) to the base station (200). At operation S624, a CS call may be established (e.g., a service communication associated with the paging indication message received in operation S612) successfully between the UE (100) and the base station (200). At operation S626, the user of the UE (100) may be disconnected from the call (e.g., the user may disconnect the call, for example, when the call is completed) and the UE (100) may be moved to the IDLE state (e.g., a call status may be set to the IDLE state).

At operation S628, the UE (100) may set the MM servicing state to NORMAL as valid TMSI is received (e.g., in response to receiving a valid TMSI during the TMSI reallocation and/or the service communication associated with the paging indication message terminating). At operation S630, the UE (100) may receive the paging information with the TMSI. For example, the UE (100) may receive a paging indication message including the valid TMSI associated with the UE (100) and the LAI-B. At operation S632, the UE (100) may respond to the paging message because the MM service state is NORMAL SERVICE. For example, at S632, the UE (100) may determine that a paging response should be sent because the MM service state is set to NORMAL SERVICE. At operation S634, the UE (100) may send the paging response to the base station (200). At operation S636, further, a call associated with the paging indication message including the valid TMSI may be established successfully between the UE (100) and the base station (200).

In some example embodiments, when the UE (100) was in the ATTEMPTING TO UPDATE MM service state, and if the UE (100) receives the valid TMSI in the TMSI reallocation procedure (when the RRC connection exists), then the UE (100) may change the MM service state to NORMAL SERVICE and may also change the update status to U1 UPDATED.

Figure 5:
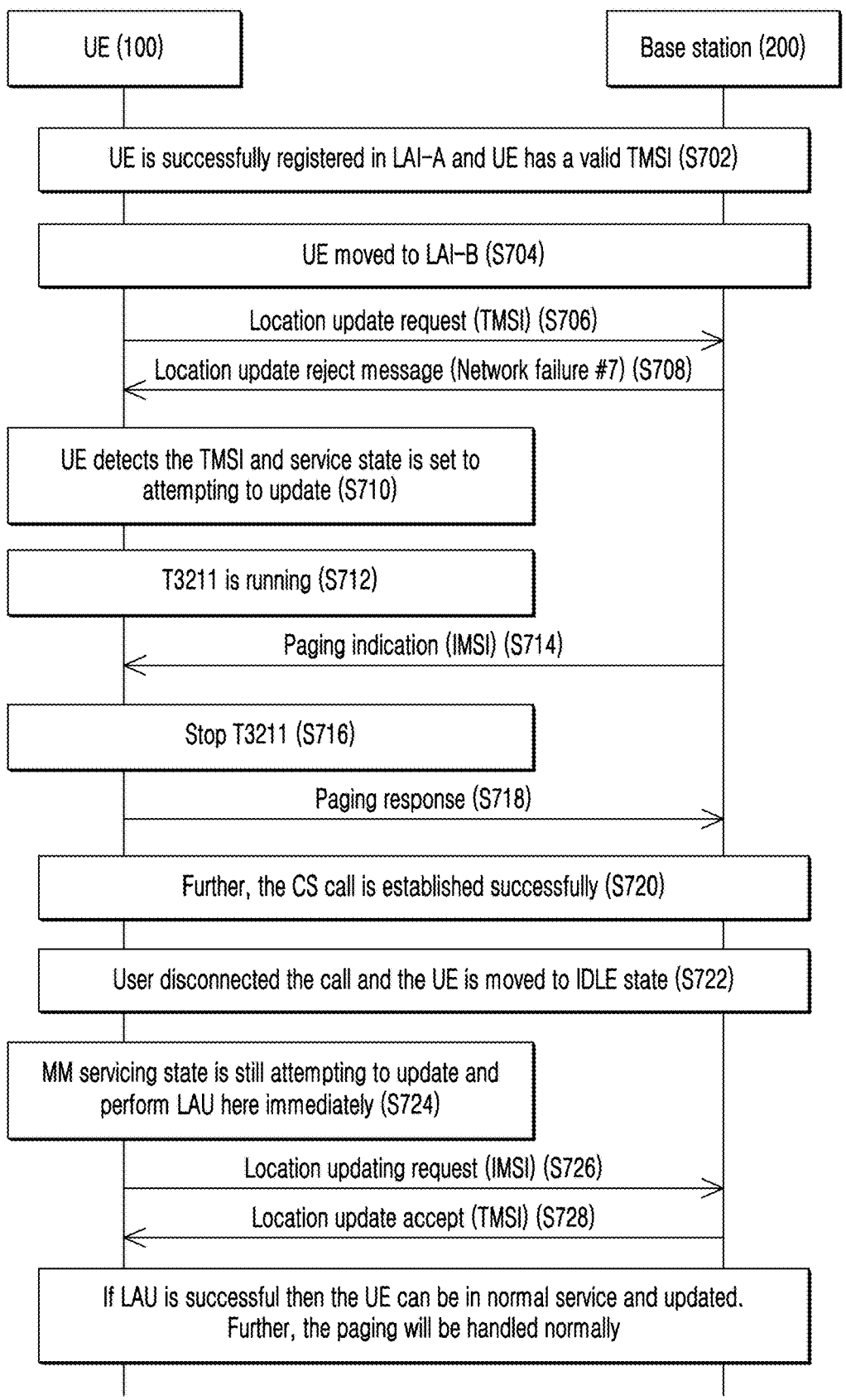
FIG. 5 is an example sequence flow diagram illustrating operations for handling the call connectivity in the wireless communication system (1000), when the UE (100) was in the ATTEMPTING TO UPDATE MM service state, and receives the Paging message with IMSI when the timer T3211, T3213, and/or T3246 is running, according to some example embodiments.

FIG. 5 is an example sequence flow diagram illustrating operations for handling the call connectivity in the wireless communication system (1000), when the UE (100) is in the ATTEMPTING TO UPDATE MM service state, and receives the Paging message with IMSI when the timer T3211, T3213, and/or T3246 is running, according to some example embodiments.

At operation S702, the UE (100) may be successfully registered in the LAI-A and the UE (100) may have the valid TMSI (e.g., a TMSI associated with the UE (100) and the LAI-A). At operation S704, the UE (100) may move to the LAI-B. At operation S706, the UE (100) may send the location update request message with the TMSI to the base station (200). At operation S708, the base station (200) may send the location update reject message to the UE (100) based on the network failure cause value #7. At operation S710, the UE (100) may detect that the TMSI and the ATTEMPTING TO UPDATE MM service state is set (e.g., as a result of operations S704-S708). For example, the UE (100) may detect (e.g., determine) that the TMSI is invalid and that the MM service state is set to ATTEMPTING TO UPDATE. At operation S712, the UE (100) may detect that the T3211 timer is running. At operation S714, the UE (100) may receive a paging indication message including an IMSI (e.g., the IMSI of the UE (100)) from the base station (200). At operation S716, the UE (100) may stop the T3211 timer. At operation S718, the UE (100) may send the paging response to the base station (200).

At operation S720, a CS call may be established (e.g., a service communication associated with the paging indication message received in operation S714) successfully between the UE (100) and the base station (200). At operation S722, the user of the UE (100) may be disconnected from the call (e.g., the user may disconnect the call, for example, when the call is completed) and the UE (100) may move to the IDLE state (e.g., a call status may be set to the IDLE state). At operation S724, the UE (100) may detect that the MM servicing state is still set to ATTEMPTING TO UPDATE and may perform the location area updating (LAU) process immediately or promptly. At operation S726, the UE (100) may send the location updating request with the IMSI to the base station (200). At operation S728, the UE (100) may receive the location update accept including the TMSI (e.g., a valid TMSI associated with the UE (100) and the LAI-B) from the base station (200). At operation S730, if the LAU is successful then the UE (100) may be in NORMAL SERVICE MM servicing state and updated.

Further, the paging (e.g., subsequent paging indication messages and corresponding service communications) may be handled normally (e.g., using the valid TMSI associated with the UE (100) and the LAI-B). According to some example embodiments, the UE (100) may establish a service using the valid TMSI (e.g., via paging messages). According to some example embodiments, the service may be at least one of a CS call, a Short Message Service (SMS) message and/or supplementary service (SS) information.

In some example embodiments, when the UE (100) is in the ATTEMPTING TO UPDATE MM service state, the UE (100) receives the paging message with IMSI, and at that time the T3211, T3213, and/or T3246 timer was running, then the UE (100) may perform location updating procedure on RRC Connection release, provided TMSI reallocation procedure was not performed when the RRC connection was available.

The above examples are provided in the context of the call service. The person having ordinary skill in the art would understand that the above examples are likewise applicable in the contexts of SMS and/or SS.

Some example embodiments disclosed herein may be implemented using processing circuitry. For example, some example embodiments may be implemented using at least one software program running on at least one hardware device and performing network management functions to control the elements.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of the some example embodiments will so fully reveal the general nature of the example embodiments that others can, by applying current knowledge, readily modify and/or adapt for various applications some example embodiments without departing from the generic concept, and, therefore, such adaptations and modifications should and are intended to be comprehended within the meaning and range of equivalents of some example embodiments. It is to be understood that the phraseology or terminology employed herein is for the purpose of description and not of limitation. Therefore, while some example embodiments herein have been described, those skilled in the art will recognize that some example embodiments can be practiced with modification within the spirit and scope of some example embodiments as described herein.

What is claimed is:

1. A method for handling a service connection in a wireless communication system, comprising:
   detecting, by a User Equipment (UE), a Mobility Management (MM) service state of the UE is set to ATTEMPTING TO UPDATE;
   starting, by the UE, a timer correcsponding to the MM service state of the UE being set to ATTEMPTING TO UPDATE, the timer having an expiry time;
   stopping, by the UE, the timer before the timer reaches the expiry time in response to receiving a first paging indication message from a base station, the first paging indication message including an International Mobile Subscriber Identity (IMSI) of the UE;
   receiving, by the UE, a valid Temporary Mobile Subscriber Identity (TMSI) in a TMSI reallocation procedure from the base station via a Radio Resource Control (RRC) connection after the stopping;
   changing, by the UE, the MM service state to a NORMAL SERVICE state in response to the receiving the valid TMSI and the detecting the MM service state of the UE being set to ATTEMPTING TO UPDATE, the changing the MM service state to the NORMAL SERVICE state being performed while the timer remains stopped before reaching the expiry time; and
   sending, by the UE, a paging response message to the base station in response to the changing the MM service state to the NORMAL SERVICE state and receiving second paging indication message from the base station for establishing the service connection, wherein the second paging indication message includes the valid TMSI.

2. The method of claim 1, further comprising:
   changing, by the UE, an update status of the UE to U1 UPDATED in response to the receiving the valid TMSI.

3. The method of claim 1, wherein the service connection is at least one of a call connection, a Short Message Service (SMS) connection or a supplementary service (SS) connection.

4. The method of claim 1, wherein the valid TMSI is associated with a current location area of the UE.

5. The method of claim 1, wherein the MM service state of the UE is set to ATTEMPTING TO UPDATE based on a failed location area updating procedure with the base station.

6. The method of claim 1, further comprising:
   sending another paging response message to the base station in response to the first paging indication message,
   wherein the receiving the valid TMSI is performed after the sending another paging response message to the base station.

7. The method of claim 6, further comprising:
   completing a communication performed based on the first paging indication message,
   wherein the changing the MM service state is performed after the completing the communication.

8. The method of claim 7, wherein the communication is a circuit switched call.

9. A User Equipment (UE) for handling a service connection in a wireless communication system, comprising:
   processing circuitry configured to,
      detect a Mobility Management (MM) service state of the UE is set to ATTEMPTING TO UPDATE,
      start a timer corresponding to the MM service state of the UE being set to ATTEMPTING TO UPPDATE, the timer having an expiry time, stop the timer before the timer reaches the expiry time in response to receiving a first paging indication message from a base station, the first paging indication message including an International Mobile Subscriber Identity (IMSI) of the UE, receive a valid Temporary Mobile Subscriber Identity (TMSI) in a TMSI reallocation procedure from the base station via a Radio Resource Control (RRC) connection after the timer is stopped, change the MM service state to a NORMAL SERVICE state in response to receiving the valid TMSI and detecting the MM service state is set to ATTEMPTING TO UPDATE, the MM service state being changed to the NORMAL SERVICE state while the timer remains stopped before reaching the expiry time, and send a paging response message to the base station in response to changing the MM service state to the NORMAL SERVICE state and receiving a second paging indication message from the base station for establishing the service connection, wherein the second paging indication message includes the valid TMSI.

10. The UE of claim 9, wherein the processing circuitry is configured to:

change an update status of the UE to U1 UPDATED in response to receiving the valid TMSI.

11. The UE of claim 9, wherein the service connection is at least one of a call connection, a Short Message Service (SMS) connection or a supplementary service (SS) connection.

12. The UE of claim 9, wherein the valid TMSI is associated with a current location area of the UE.

13. The UE of claim 9, wherein the MM service state of the UE is set to ATTEMPTING TO UPDATE based on a failed location area updating procedure with the base station.

14. The UE of claim 9, wherein the processing circuitry is configured to:

send another paging response message to the base station in response to the first paging indication message; and receive the valid TMSI after sending the other paging response message to the base station.

15. The UE of claim 14, wherein the processing circuitry is configured to:

complete a communication performed based on the first paging indication message; and change the MM service state to a NORMAL SERVICE state after completing the communication.

16. The UE of claim 15, wherein the communication is a circuit switched call.

* * * * *